United States Patent
Sciammarella et al.

[19]

[11] Patent Number: 5,886,698
[45] Date of Patent: Mar. 23, 1999

[54] METHOD FOR FILTERING SEARCH RESULTS WITH A GRAPHICAL SQUEEGEE

[75] Inventors: Eduardo Sciammarella; Franklin Servan-Schreiber, both of New York, N.Y.

[73] Assignees: Sony Corporation, Tokyo, Japan; Sony Electronics, Inc., Park Ridge, N.J.

[21] Appl. No.: 844,592

[22] Filed: Apr. 21, 1997

[51] Int. Cl.[6] .................................................... G06F 3/00
[52] U.S. Cl. ...................... 345/349; 345/968; 345/974; 707/5; 707/7
[58] Field of Search .................................. 345/326–358, 345/968, 977, 974; 707/3–6, 104

[56] References Cited

U.S. PATENT DOCUMENTS

| | | | |
|---|---|---|---|
| 5,339,433 | 8/1994 | Frid-Nielsen | 345/349 X |
| 5,421,008 | 5/1995 | Banning et al. | 345/968 X |
| 5,428,734 | 6/1995 | Haynes et al. | 345/349 |
| 5,428,776 | 6/1995 | Rothfield | 345/968 X |
| 5,471,613 | 11/1995 | Banning et al. | 345/968 X |
| 5,579,471 | 11/1996 | Barber et al. | 345/968 X |
| 5,636,350 | 6/1997 | Eick et al. | 345/356 |
| 5,659,742 | 8/1997 | Beattie et al. | 707/104 |
| 5,701,456 | 12/1997 | Jacopi et al. | 345/968 X |
| 5,721,900 | 2/1998 | Banning et al. | 345/968 X |
| 5,721,901 | 2/1998 | Banning et al. | 345/968 X |
| 5,751,286 | 5/1998 | Barber et al. | 345/348 |
| 5,796,395 | 8/1998 | De Hond | 345/331 |

*Primary Examiner*—John E. Breene
*Attorney, Agent, or Firm*—Frommer Lawrence & Haug, LLP.; William S. Frommer

[57] ABSTRACT

Images representing search results are displayed on a screen of a computer system. The search results are responsive to a search in a database initiated by a user by entering a keyword or keywords via an input device. The images are displayed in such a way that an image corresponding to the highest matching value is the largest is size, while remaining matches are represented by images in direct proportion to their relevance to the keyword. In addition, the relevance of an image is indicated by its proximity to the keyword displayed on the screen: the closer the displayed image to the keyword, the more relevant the match represented by that image is to that keyword. This display operation is equivalent to two simultaneous searches with boolean operators "OR" and "AND". A graphical squeegee may be dragged across images representing search results in order to filter the results based on a keyword. The squeegee is displayed as a vertical bar and is associated with a keyword. As the squeegee is moved across the screen, images relevant to the keyword are moved while remaining images are not moved.

14 Claims, 9 Drawing Sheets

FIG. 1
(PRIOR ART)

You searched all sites for: | cooking spanish | Go Get It!

You found 12126 relevant documents from a total of 60,434,860 indexed Web pages:
Cooking,Spanish, ...

1) SPANISH COOKING
　　　SPANISH COOKING Typical Spanish Dishes Spanish Omelette (Tortilla de patatas) A Galician recipe for hake (Merluza a la gallega) Chicken with tomato and pepper ...
http.//www.spaintour.com./cooking.htm (24k)
[100%, 2 of 2 terms relevant]

2) SPANISH COOKING
　　　SPANISH COOKING Typical Spanish Dishes Spanish Omelette (Tortilla de patatas) A Galician recipe for hake ( Merluza a la gallega) Chicken with tomato and pepper...
http.//www.or e-mail.com.co/-spain/cooking.htm.(24k)
[99%, 2 of 2 terms relevant]

/–102
3) Michael's Cooking Page
　　　Michael's Cooking Page Michael's cooking Page The food I sampled in Spain changed my idea of spices and flavors. Spices in Spanish foods are of course varied but tend to suit...
http.//www.2gol.com./users/mibusho/cooking.htm./(2k)
[49%, 2 of 2 terms relevant]

/–104
4) Grilling Greatness
　　　Grilling Greatness (Search the Encyclopedia) Grilling Greatness 1990 ANYWHERE IN SOUTHWEST From coast to coast and especially in the South and West, there is one form of cooking that...
http.//www. adventure.com./library/encyclpedia/america/barbecue.htm/(3k)
[49%, 2 of 2 terms relevant]

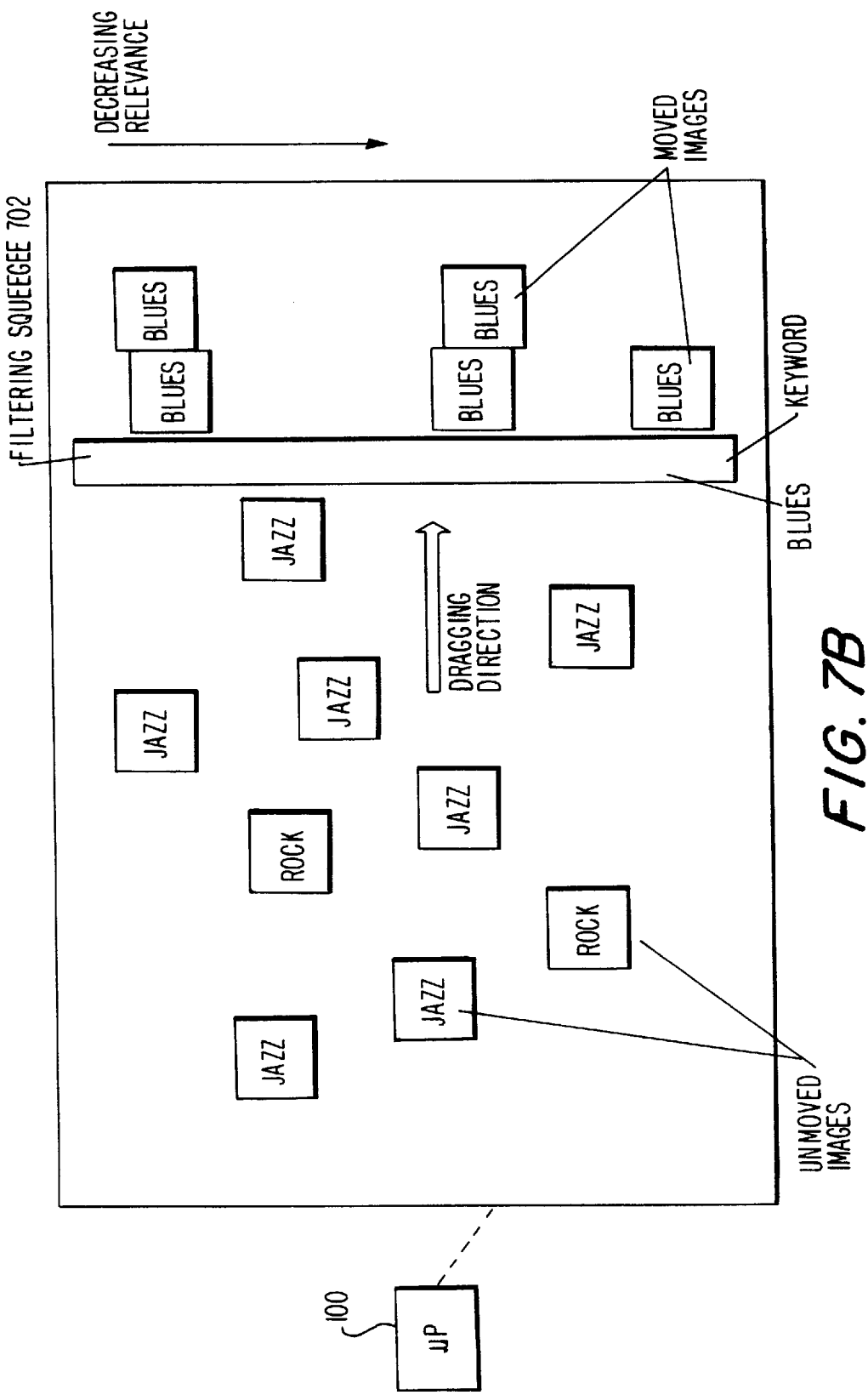

METHOD FOR FILTERING SEARCH RESULTS WITH A GRAPHICAL SQUEEGEE

BACKGROUND OF THE INVENTION

The invention is related to a Graphical User Interface (GUI) and, in particular, a method for graphically displaying on a computer screen results of a search conducted on the Internet, local and remote databases of content providers, etc.

It is widely known that search engines, i.e., computer programs written to perform searches of databases, mainly use three boolean operators "AND", "OR" and "NOT". A typical search request might be "word X AND word Y" where both words must occur in a document to designate a particular document as being of relevance to a user.

There are several problems with these types of search requests. Unless the user enters the desired Boolean operator, the search engine must use a default operator, such as "AND" for example. Furthermore, the user generally cannot use both of the Boolean operators "AND" and "OR" in the same search. In this case, two separate searches are required to be performed to obtain the desired results.

In addition in the prior art, after the request has been entered by the user, the search engine examines multiple documents on the Internet, for example, for the entered keywords. A full text search, a document title search, a document abstract search, etc. may be executed. Depending on the search engine algorithm, which in many cases is proprietary, a list of results is then produced which the search engine determined, according to its algorithm, to be relevant to the user request.

A typical list of search results from the Internet is shown in FIG. 1. The documents are listed in descending order based on their relevancy values. Unless the user carefully examines these figures for each "hit" buried in the list of search results, he or she may be unaware of the large difference in relevancy values between the second and third "hits" in FIG. 1, for example. Furthermore, a list of "hits" in descending order generally indicates that one "hit" is more relevant than the other "hit", because one "hit" is numbered 3 and the other is numbered 4. Yet this is not the case with typical search engines 15 as is apparent from FIG. 1. The two "hits" labeled 102 and 104 in FIG. 1 have the same relevancy but are displayed sequentially, possibly confusing and misleading the user about the search results.

OBJECTS OF THE INVENTION

It is an object of the present invention to provide a graphical display of search results to indicate relevancy of the results to the search terms.

It is another object of the present invention to provide a graphical display of search results such that the image size of a "hit" indicates a relevancy value with respect to the search terms.

It is a further object of the present invention to provide a graphical display of search results such that two search requests using boolean operators "AND" and "OR", respectively, are displayed on the screen at the same time.

It is still another object of the present invention to provide a graphical display of a filtering operation following the display of the search results.

It is yet another object of the present invention to provide a graphical display of search results clearly indicating to a user that two or more "hits" are equally relevant to the search request.

SUMMARY OF THE INVENTION

These and other objects, features and advantages are accomplished by an apparatus and method for selectively displaying images on a screen in a computer system. As images are displayed, a graphical object is provided on the screen and assigned a first predetermined keyword. The graphical object is moved across the screen over the images such that those images that are relevant to the first predetermined keyword are manipulated by the graphical object while the remaining images remain unmanipulated.

In accordance with one aspect of the present invention, the displayed images represent respective search results in the computer system. The search results are in response to a search for information in a database initiated by a user by entering a second predetermined keyword into the computer system. Prior to displaying the images on the screen, documents are examined in the database and relevance of each document to the second predetermined keyword is determined. Only those documents that are relevant to the second predetermined keyword are obtained as search results which are provided as respective images.

In accordance with another aspect of the present invention, images of the search results that are relevant to the first predetermined keyword are moved by the graphical object.

In accordance with yet another aspect of the present invention, images of the search results that are relevant to the first predetermined keyword disappear from the screen as the graphical object moves.

In accordance with still another aspect of the present invention, images of the search results that are relevant to the first predetermined keyword are highlighted on the screen as the graphical object moves.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which:

FIG. 1 is a prior art screen display of the search results arranged in a list in response to a search performed on the Internet.

FIG. 7B is a screen display of search results subsequent to the filtering operation according to the present invention.

In all Figures, like reference numerals represent the same or identical components of the present invention.

DETAILED DESCRIPTION OF THE PREFERRED EMBODIMENTS

The invention will now be explained in detail with reference to the accompanying drawings.

Figure 2:
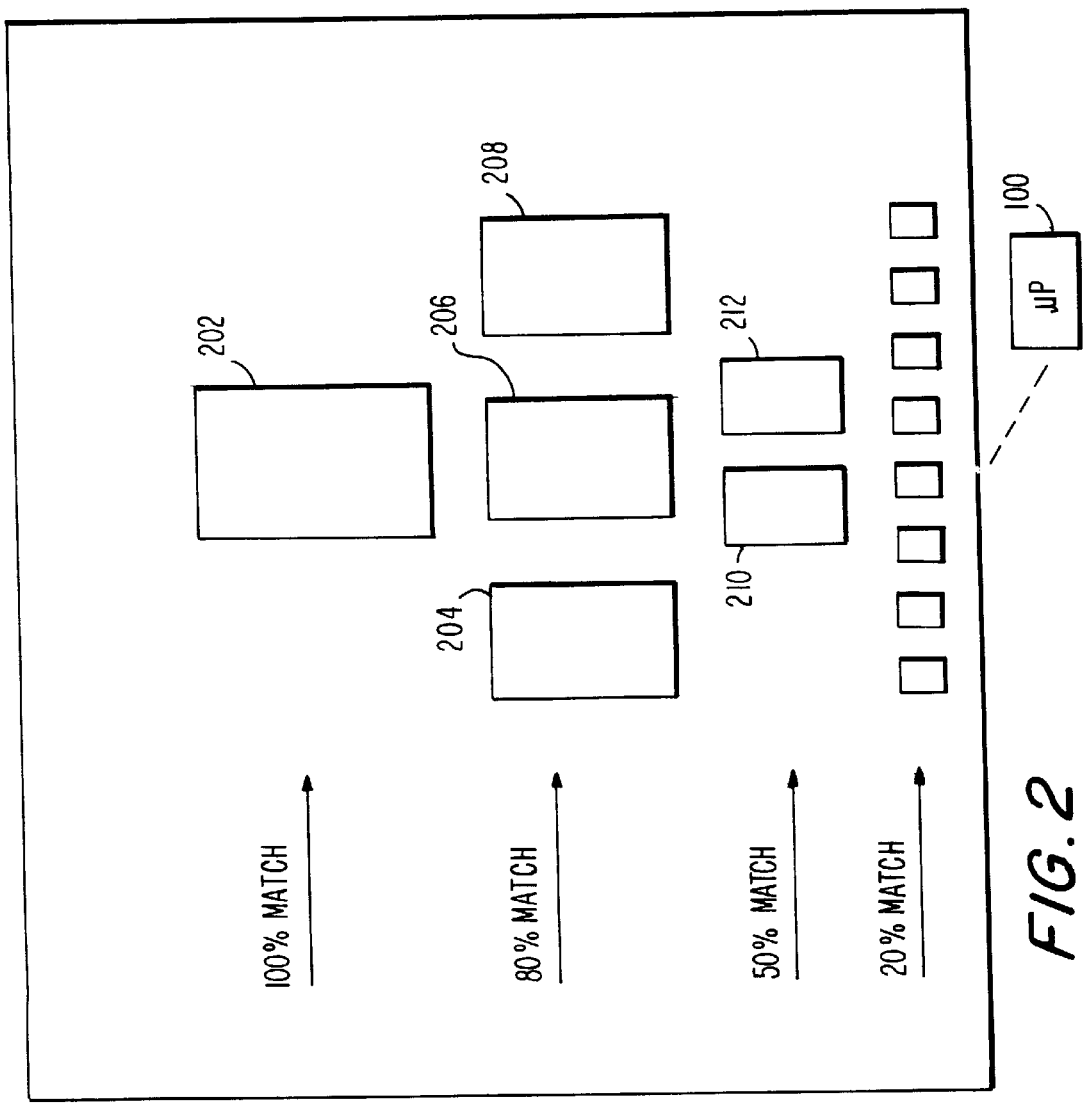
FIG. 2 is a screen display of search results following the search request in accordance with one embodiment of the present invention.

FIG. 2 is a screen display of search results following a search request in accordance with one embodiment of the present invention. In general, it is observed that in response to a typical search request, there are more matches, i.e., "hits", with a lower relevance value than matches with a higher relevance value, expressed in terms of percentages for example. Namely, it is only logical that the probability is greater that more documents will be somewhat relevant to the search request rather than highly relevant.

Based on a statistical average that progressively more potential matches are found as the relevance value decreases, the present invention displays the search results in a pyramid form. As shown in FIG. 2, images of those results having the highest relevance value are located at the top of the display screen. Results with lower relevance values are displayed toward the bottom of the screen in descending order. It is worth noting that matches with identical relevance values are displayed on the same level on the screen.

As shown in FIG. 2, the pyramid display indicates in a simple and quick manner the relevance of search results in response to the user request. According to the present invention, the images on the display screen graphically indicate the search results in a clear and easy-to-understand manner. This is in contrast to the prior art lists numbering the results sequentially and possibly causing confusion among users when several relevance values are identical. In the present invention, each displayed image on the screen can be selected via an input device, such as a mouse, and then "zoomed in" or accessed for a closer examination of the found material.

In accordance with another aspect of the present invention, the images arranged in the pyramid form are displayed in such a way that the most relevant match occupies the largest screen display area. Hence, FIG. 2 shows the match result of 100% having the largest display image, while the other images of "hits" appear progressively smaller on the screen as their relevance values decrease. That is, image 202 has the largest display area, because it is the most relevant to the search request. Images 204, 206 and 208 are smaller than the image 202 because their relevance values are smaller. Similarly, images 210 and 212 are smaller in size than the images above them, since the relevance values of the images 210 and 212 are 50%. Finally, each image in the bottom row of FIG. 2 occupies very small area which is in correspondence with their relevance values.

With the above configuration, the user can immediately view the most relevant search result on a very large scale without the necessity to "zoom in" to read its contents. Among other things, having images sized according to their relevance values reduces the overall display clutter. Namely, the search results that are the most relevant are easy to view and read, while those that are less relevant are smaller and inconspicuous. It will be appreciated that less relevant matches do not detract from the user's attention to the more relevant match due to their small size. In case, however, a less relevant match having a small image display needs to be reviewed, the user can select that image by pointing with a cursor and zoom to it using an input device, such as a mouse or lightpen.

Figure 3:
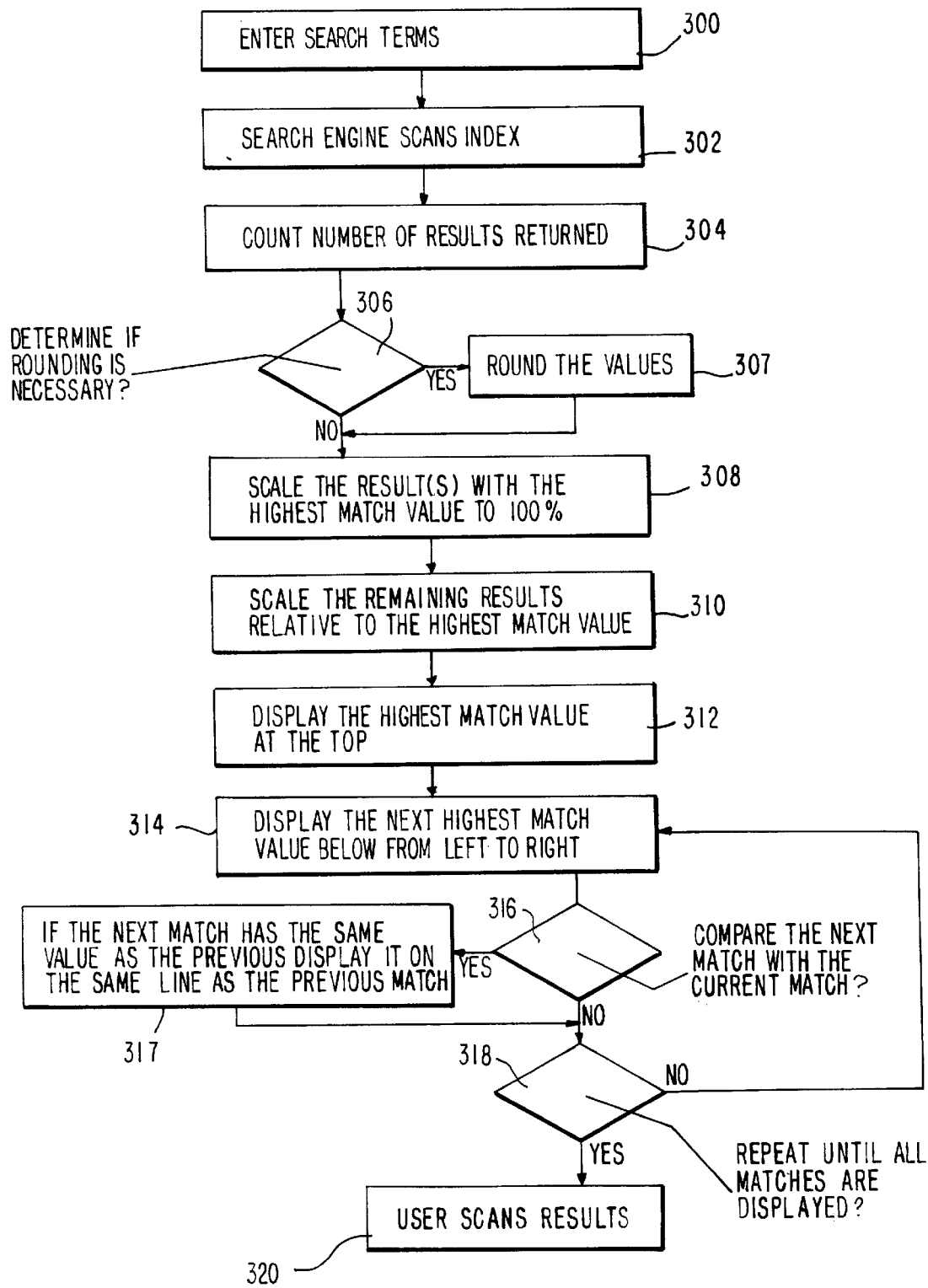
FIG. 3 is a flowchart for displaying search results in accordance with the screen display of FIG. 2.

FIG. 3 is a flowchart for displaying search results in accordance with the above description of the present invention. In step 300, the user enters search terms into a computer system to find the needed information on the Internet, for example. Next, in step 302, the search engine, i.e., a computer program employed by the user to search the Internet, scans a predetermined index of documents as defined by designers of the search engine. The number of "hits" returned by the search engine are then counted in step 304.

A decision is then made in step 306 whether a match value indicating the relevancy pertaining to each "hit" needs to be rounded to the nearest integer value, for example. If so, the values are rounded in step 307, if necessary. The process then continues with step 308 in which the result or results with the highest match values are scaled to 100%. In addition, the highest match value has image dimensions adjusted to a predetermined size to be displayed as the largest image on the screen. In step 310, the remaining search results are scaled in relation to the highest match value and also adjusted to the predetermined image sizes occupying progressively less display area on the screen as their match values (i.e., relevance) decrease.

The highest match value is then displayed as the largest image at the top of the screen in step 312. In step 314, the next highest match value is displayed immediately below the highest match value. If the next match has the same value as the previous match as determined in step 316, it is displayed in step 317 on the same level on the screen as the previous match. The above-described display steps are repeated for the next "hit" until all match results are displayed on the screen, as determined in step 318. Following the last image display, the user can view the results of the search on the screen in step 320.

Figure 4:
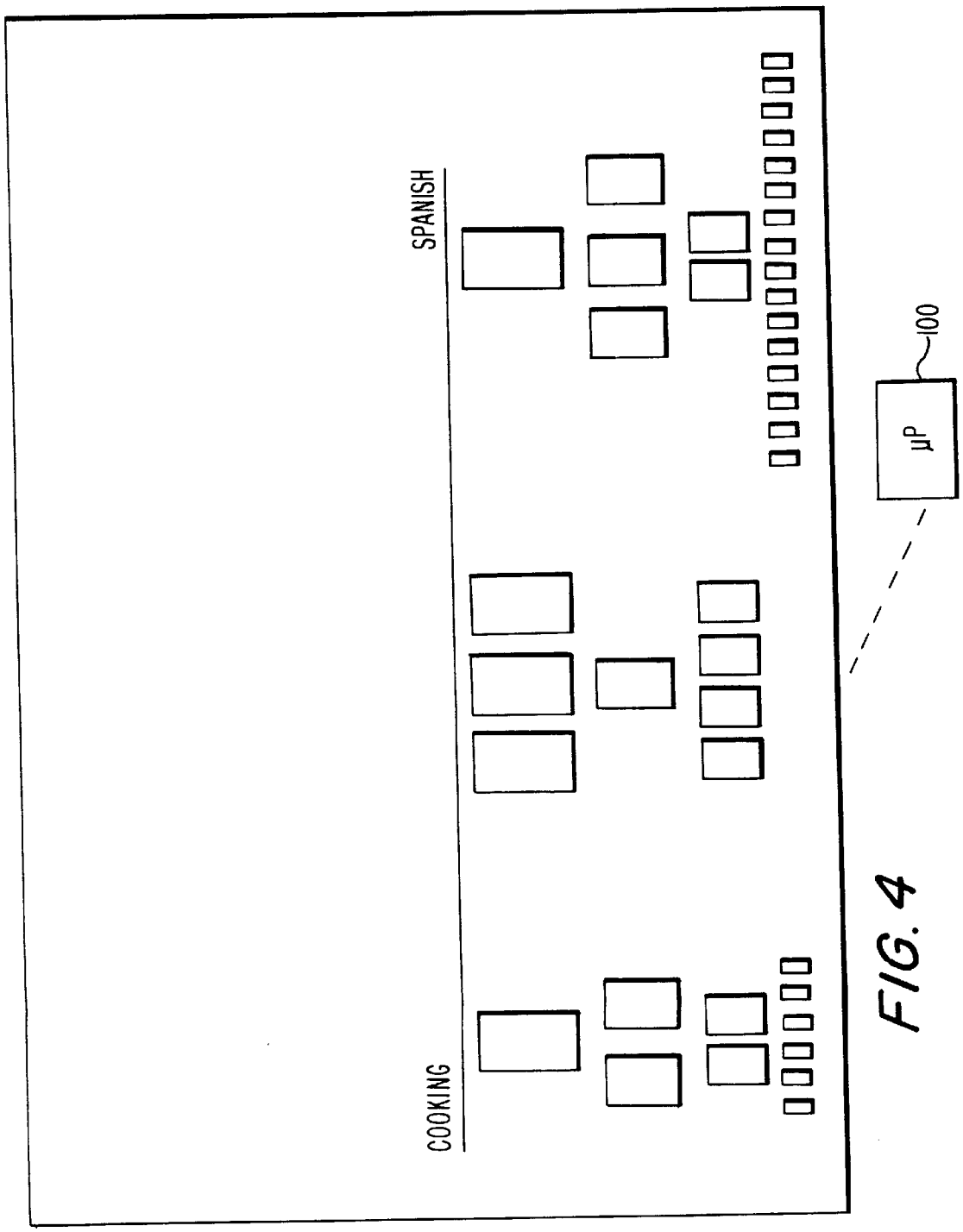
FIG. 4 is a screen display of search results indicating the equivalent results of logical search operations using two keywords with boolean operators "AND" and "OR".

FIG. 4 shows another aspect of the present invention. In particular, the present invention solves the problem in the prior art of having to include at least one boolean operator in a search request, as described above. Furthermore, the present invention eliminates the prior art need to enter two separate searches using boolean operators "AND" and "OR", such as "keyword1 AND keyword2" and "keyword1 OR keyword2", as also mentioned above.

According to the present invention, a search is initiated by entering a search request with two keywords such as "cooking" and "spanish," for example. Following the search of the documents in databases for occurrences of these two words, the search engine displays these two terms on the opposite sides of a single line, i.e., continuum. The line can be vertical or horizontal, depending on the user preference. As shown in FIG. 4, one end of the line is labeled "cooking" while the other end is labeled "spanish" in correspondence with the entered keywords.

FIG. 4 shows that the results of the search are displayed along this continuum, i.e., the line joining two ends labeled as "cooking" and "spanish". Those "hits" that are located along the line closer to the end labeled "cooking" are more relevant to the keyword "cooking". Similarly, "hits" positioned along the line closer to the end labeled "spanish" have higher relevance to the keyword "spanish".

The search results clustered at the two ends of the line, i.e., its extremes, are equivalent to using the boolean operator "OR". In other words, these two extremes are equivalent to running a search "spanish OR cooking": those matches located on the "spanish" end of the line are irrelevant to "cooking", and conversely matches displayed on the "cooking" end of the line are irrelevant to "spanish".

Those search results that are clustered closer to the center of the line are relevant to both "cooking and spanish".

Hence, the center of this continuum is equivalent to using the boolean operator "AND" as if the search request "spanish AND cooking" had been entered.

It will be appreciated that the entry of a single search request provides the results of two boolean operators. This is in contrast to the conventional method requiring two separate entries of two search requests to produce the desired results. Furthermore, according to the present invention, the user does not have to remember to enter at least one boolean operator or risk being assigned a default operator such as "AND", for example. In accordance with the present invention the results are automatically distributed along the line—based on their relevancy to the entered keywords—indicating the boolean operation as a function of their locations along the line.

As further shown in FIG. 4, the search results distributed along the line may take on a pyramid shape as described above with reference to FIGS. 1–3. That is, those matches with high match values (i.e., very relevant) are displayed above matches that are less relevant to the search request in descending order, while two or more "hits" with identical match values are displayed on the same level. In addition, images representing more relevant "hits" appear larger on the display screen than images of less relevant "hits." As mentioned above, the relevance of a particular document to the keyword is determined by a specific algorithm which may be proprietary to each search engine.

Figure 5:
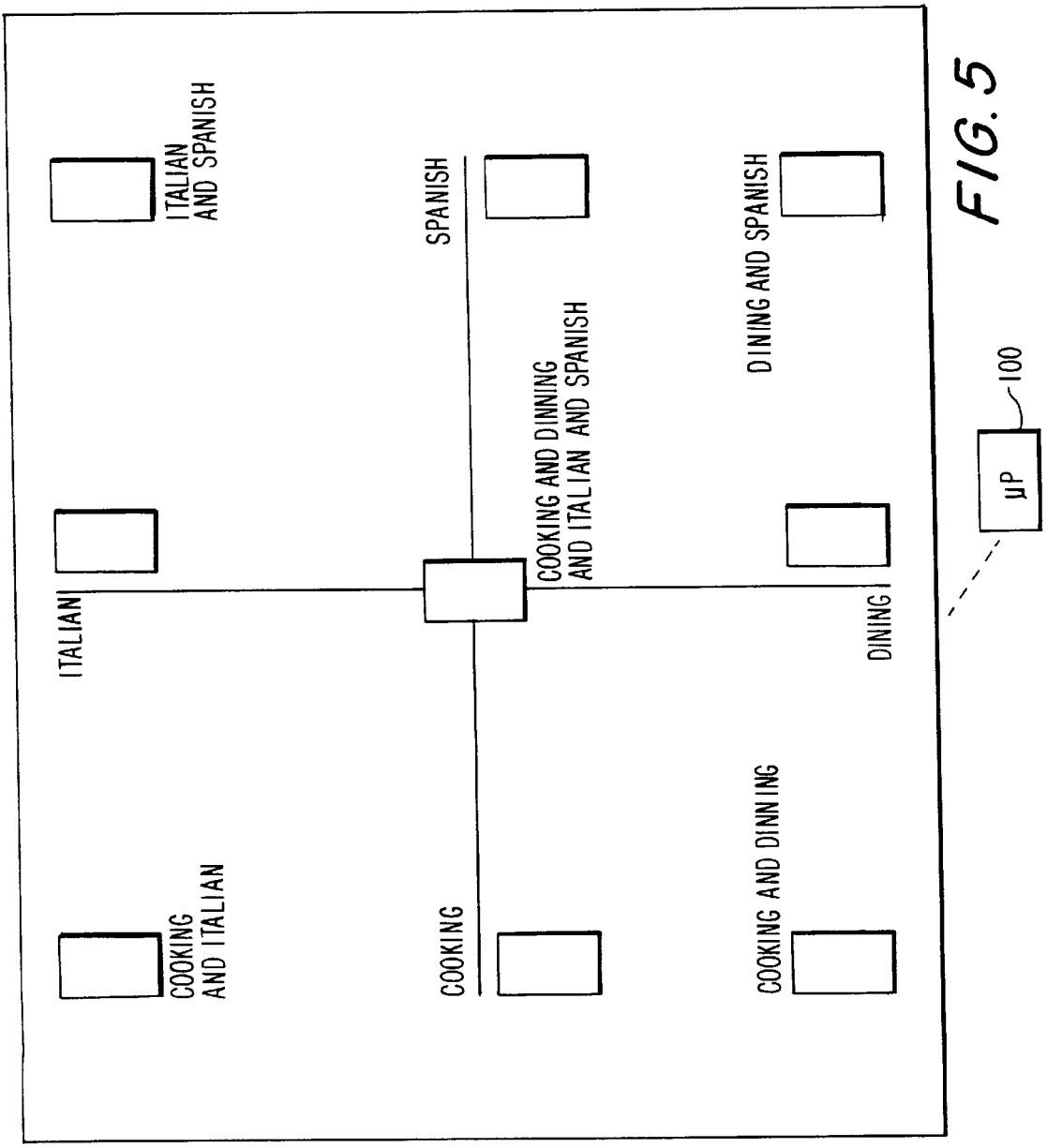
FIG. 5 is a screen display of search results indicating the equivalent results of logical search operations using four keywords with boolean operators "AND" and "OR".

The search method using a single continuum with two keywords located at opposite ends can be extended to two continuums, i.e., two lines located perpendicular to each other, with four keywords, for example. As shown in FIG. 5, the search results located at the intersection of the perpendicular lines are relevant to all four keywords: "cooking", "spanish", "dining" and "italian". This is equivalent to the search request "keyword1 AND keyword2 AND keyword3 AND keyword4" which, in the example illustrated in FIG. 4, denotes "cooking AND spanish AND dining AND italian".

Continuing with the description of FIG. 5, search results located in each quadrant are relevant only to those keywords which define that quadrant, being equivalent to the search request "keyword1 AND keyword2." Namely, images of "hits" in the top left quadrant are relevant to "cooking AND italian" because those keywords delineate that quadrant. Similarly, the top right quadrant is defined by the keywords "italian" and "spanish" and any search results displayed in that quadrant are relevant to those keywords, as shown in FIG. 5. The same logic applies to the bottom quadrants as is apparent from FIG. 5 illustrating images of "hits" having relevance to "spanish", "dining" and "cooking".

Finally, search results clustered at the end of each continuum is relevant to a single keyword only. This being equivalent to "keyword1 OR keyword2 OR keyword3 OR keyword4," which in the example illustrated in FIG. 5 signifies "cooking", "spanish", "italian" or "dining".

Figure 6:
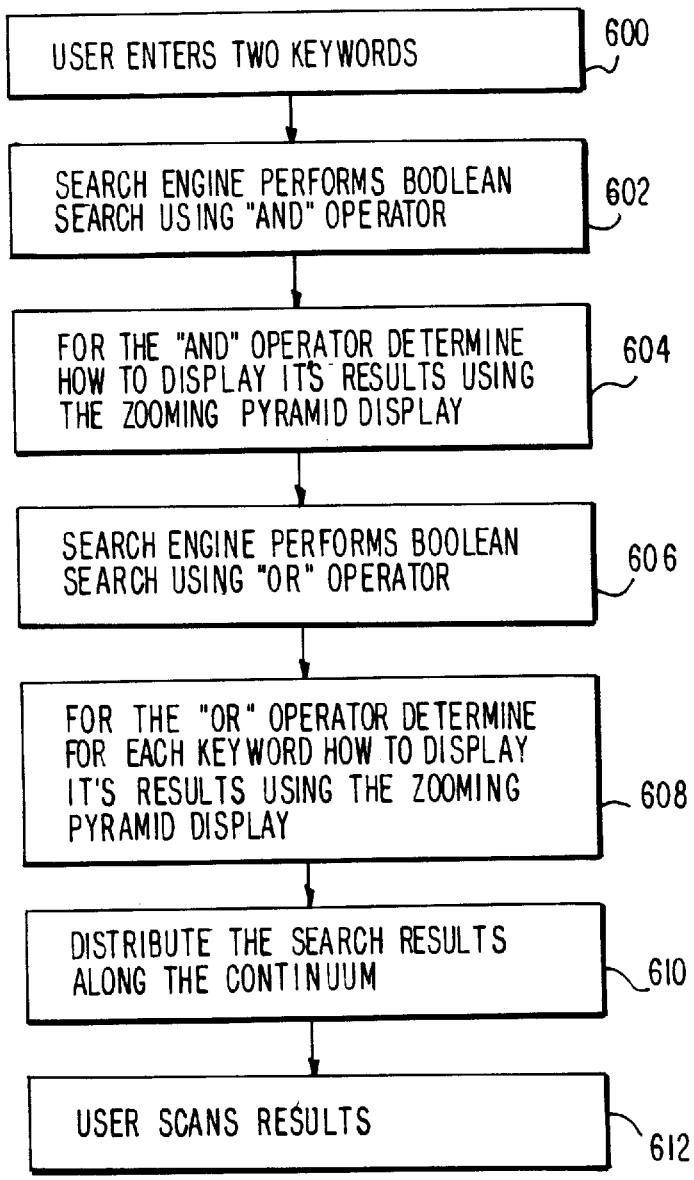
FIG. 6 is a flowchart for displaying search results in accordance with the screen displays of FIGS. 5 and 6.

FIG. 6 is a flowchart for displaying search results in accordance with the above aspect of the present invention. In step 600, the user enters two keywords to run the search. The search engine performs the search using the boolean operator "AND" in step 602. The results of this search are then arranged in the pyramid form in step 604 which was described above with reference to FIGS. 1–3. Next, in step 606, another search using a boolean "OR" operator is carried out and the results of this search are also arranged in the pyramid form in step 608. The search results are then distributed on the screen in step 610 by displaying them in predetermined locations along the line based on the preceding boolean operations. Following step 610, the results of the search including boolean operators "AND" and "OR" are graphically illustrated on the screen, as indicated in step 612 in FIG. 6.

After the search results are displayed on the screen as described above with reference to FIG. 1–6, the user may want to perform an additional filtering operation. For example, after viewing the "hits" on "cooking" and "spanish", the user determines that many "hits" also contain information about "chinese cooking" which may not be of interest at the time the user is viewing the results. Since display images of "chinese cooking" representing the search results may be cluttering up the overall screen display, the user performs a further filtering operation to eliminate this unwanted information display. Filtering out the "chinese cooking" results would be equivalent to using the boolean operator "NOT" resulting in the search request "cooking" AND "spanish" NOT "chinese".

Figure 7A:
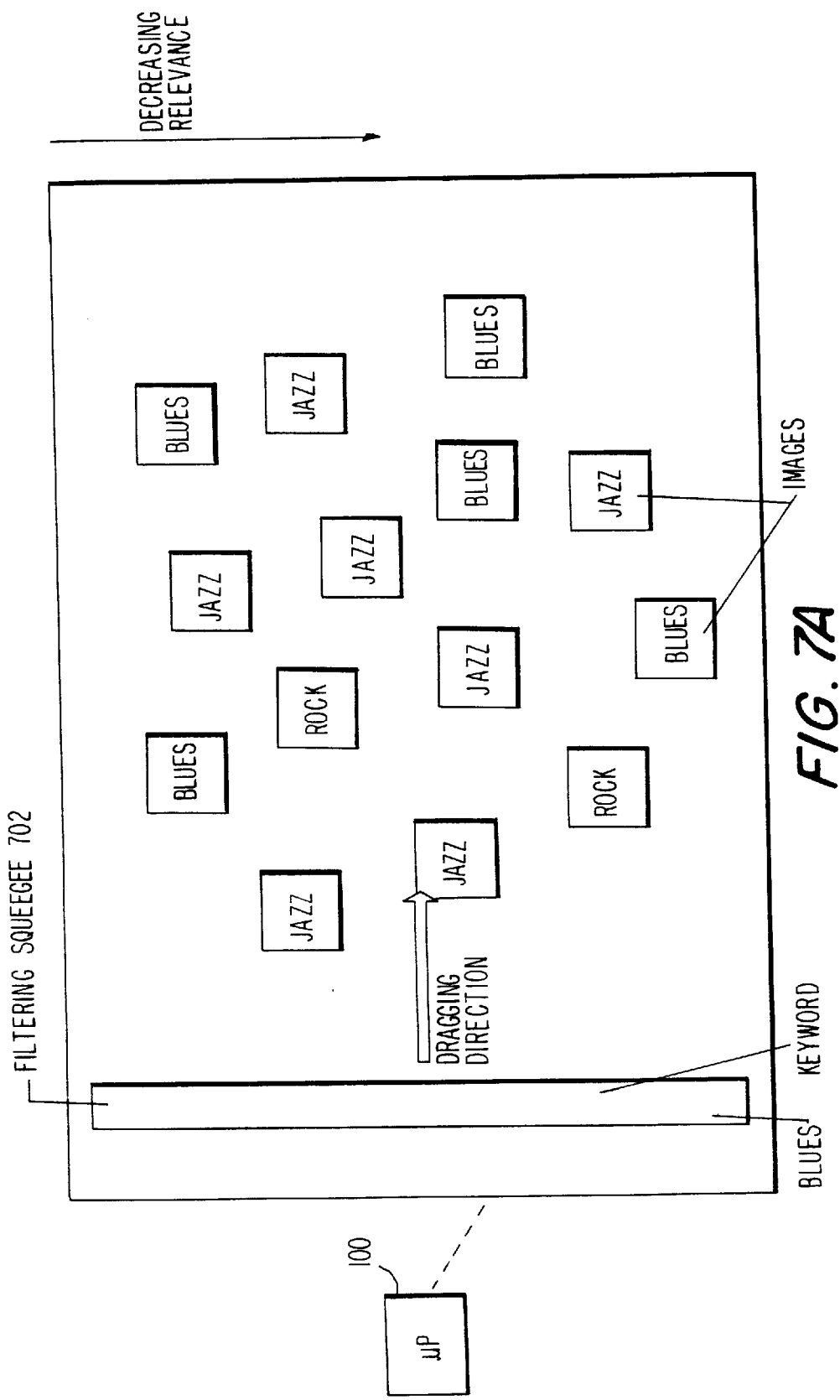
FIG. 7A is a screen display of search results prior to a filtering operation according to the present invention.

FIGS. 7A and 7B illustrate an aspect of the present invention dealing with the filtering operation. As shown in those figures, the search results of a CD collection including, for example, rock, jazz and blues types of music are displayed on the screen in the order of decreasing relevance from top to bottom. The filtering operation is performed by a graphical object such as vertical bar 702 (i.e., "squeegee") moving in the direction of the arrow. The squeegee contains the keyword "blues" entered by the user in response to an appropriate prompt from the system. Once the keyword is entered, the squeegee—under user control or automatically—passes over the search results, i.e., rock, jazz and blues images on the screen, in the direction of the arrow. Since the squeegee has been designated with the word "blues", only blues CD albums are collected on the screen, i.e., "dragged" along with the squeegee, while other CD albums are left undisturbed. The result of this filtering operation is shown in FIG. 7B where the squeegee isolated the blues CD albums on the screen while allowing the other albums to "pass" through it unmodified.

It is understood, of course, that the squeegee movement may take place in any direction: from left to right and vice versa, as well as from top to bottom and vice versa. In addition, following the filtering operation, the squeegee may return to its original position for another pass over the displayed images, i.e., additional filtering of the search results. Furthermore, in the above example, the filtered images corresponding to the "blues" are moved on the display by the squeegee. Alternatively, the blues CD albums may remain on the screen in their original display positions following the initial search, while having rock and jazz CD albums dragged by the squeegee across the screen.

Furthermore, in another alternative aspect of the present invention, images of those search results that are relevant to the keyword in the squeegee disappear from the screen as the squeegee moves. Or, images of those search results that are relevant to the keyword in the squeegee are highlighted on the screen during the motion of the squeegee.

Figure 8:
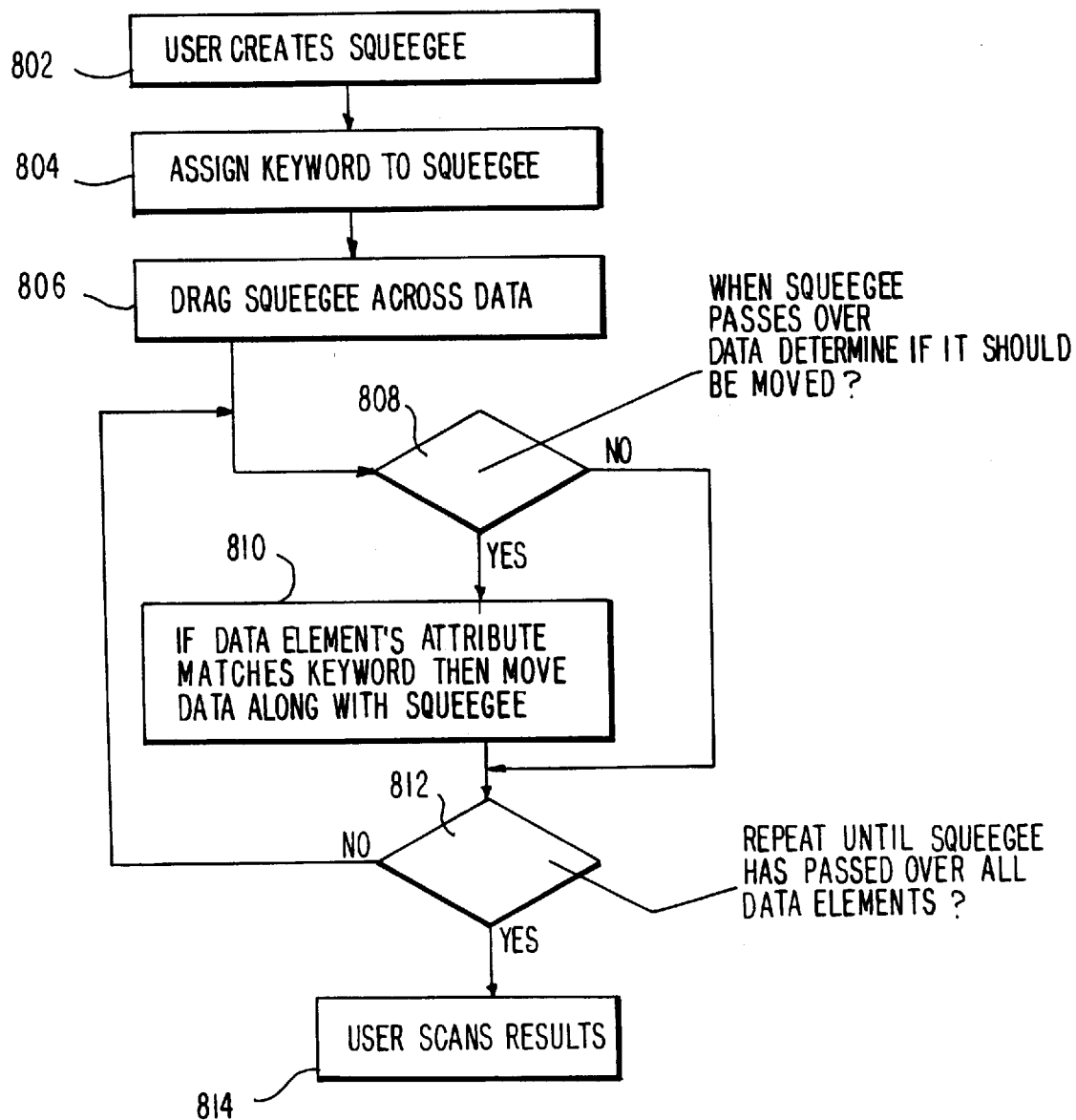
FIG. 8 is a flowchart for displaying search results following the filtering operation of FIG. 7B.

FIG. 8 is a flowchart for displaying search results in accordance with the above squeegee operation of the present invention. In step 802, the user creates, i.e., brings up on the screen, a graphical object that may be shaped like a rectangle, i.e., "squeegee", to perform additional filtering of the search results. The keyword is then assigned to the squeegee by the user in step 804 based on the desired filtering operation. The squeegee is then dragged across the displayed images on the screen in step 806. When the squeegee passes over the displayed images, it is decided in step 808 whether any of the images must be moved to a new display position, for example.

If attributes of an image correspond to the keyword assigned to the squeegee, that image is dragged on the screen along with the squeegee in step 810. Otherwise, the squeegee allows that image to "pass" through it. The squeegee then passes over the remaining displayed images of the search results in step 812, dragging some of them along as the matches occur. Subsequently, the user can view the results of the filtering operation in step 814, following the display of the initial search results, to create a blues only playlist, for example, or to interact solely with rock and jazz CD collection.

It will be appreciated that the above-described filtering operation may be performed not only on search results represented by images, but on any displayed images. That is, multiple images not necessarily representing search results are displayed on the screen and need to be re-arranged in a particular order. According to the present invention as described above, the images can be visually sorted, re-arranged, filtered, etc. on the screen by assigning one or multiple predetermined keywords to the squeegee and selectively moving it once or several times over the images on the screen.

FIGS. 2, 4, 5, 7A and 7B show the display screen under the control of microprocessor 100. It will be appreciated that the microprocessor 100 or any other programmable controller may be programmed to effect the operations of the present invention as described above with reference to those figures and in accordance with the flowchart operations of FIGS. 3, 6 and 8. The present invention may be implemented on a dedicated system having a screen for displaying graphical objects, an input device for manipulating them on the screen, and at least one programmable controller effecting various operations of the system. Alternatively, the above operations may be performed on a general-purpose personal computer programmed to carry out those operations and equipped with an input device such as a mouse, lightpen, touch-screen display, etc.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for selectively displaying on a screen a plurality of images in a computer system, said method comprising the steps of:

displaying images on said screen;

providing a graphical object on said screen and assigning a first predetermined keyword to said graphical object; and moving said graphical object across said screen over said images such that those images that are relevant to said first predetermined keyword are manipulated by said graphical object while the remaining images remain unmanipulated.

2. The method according to claim 1, wherein said displayed images represent respective search results in said computer system, said search results being in response to a search for information in a database initiated by a user by entering a second predetermined keyword into said computer system.

3. The method according to claim 2, further comprising, prior to the step of displaying said images on said screen, the steps of:

examining a plurality of documents in said database and determining relevance of each document to said second predetermined keyword;

obtaining as said search results only those documents that are relevant to said second predetermined keyword; and providing said search results as respective images.

4. The method according to claim 3, wherein images of said search results that are relevant to said first predetermined keyword are moved by said graphical object.

5. The method according to claim 3, wherein images of said search results that are relevant to said first predetermined keyword disappear from said screen as said graphical object moves.

6. The method according to claim 3, wherein images of said search results that are relevant to said first predetermined keyword are highlighted on said screen as said graphical object moves.

7. A method for selectively displaying on a screen a plurality of images in a computer system, said method comprising the steps of:

displaying images on said screen;

providing a graphical object on said screen and assigning a first predetermined keyword to said graphical object; and moving said graphical object across said screen over said images such that those images that are relevant to said first predetermined keyword remain unmanipulated on said screen while the remaining images are manipulated by said graphical object.

8. The method according to claim 7, wherein said displayed images represent respective search results in said computer system, said search results being in response to a search for information in a database initiated by a user by entering a second predetermined keyword into said computer system.

9. The method according to claim 8, further comprising, prior to the step of displaying said images on said screen, the steps of:

examining a plurality of documents in said database and determining relevance of each document to said second predetermined keyword;

obtaining as said search results only those documents that are relevant to said second predetermined keyword; and providing said search results as respective images.

10. The method according to claim 9, wherein images of the remaining search results disappear from said screen as said graphical object moves.

11. The method according to claim 9, wherein images of the remaining search results are highlighted on said screen as said graphical object moves.

12. A method for displaying on a screen of a computer system a plurality of images representing a group of search results, said group of search results being in response to a search for information in a database initiated by a user by entering a keyword into said computer system, said method comprising the steps of:

examining a plurality of documents in said database and determining relevance of each document to said keyword;

obtaining a group of search results containing only those documents that are relevant to said keyword;

displaying a plurality of images at predetermined positions on said screen, each image located at a respective position corresponding to a match value indicating document relevance to said keyword;

providing a graphical object on said screen and assigning a second keyword to said graphical object; and moving said graphical object across said screen over said plurality of images, wherein those images relevant to said second keyword are moved along with said graphical object while other images remain in their corresponding display positions on said screen such that a filtering operation is performed.

13. The method according to claim 12, wherein said graphical object is moved in a direction of its initial position such that a second filtering operation is performed.

14. An apparatus for selectively displaying on a screen a plurality of images in a computer system, said apparatus comprising:

a controllable processor programmed to display images on said screen, to provide a graphical object on said screen and assign a predetermined keyword to said graphical object, and to move said graphical object across said screen over said images such that those images that are relevant to said predetermined keyword are manipulated by said graphical object while the remaining images remain unmanipulated.

* * * * *